T. S. MILLS.
Grain Drill.
No. 42,390. Patented April 19, 1864.
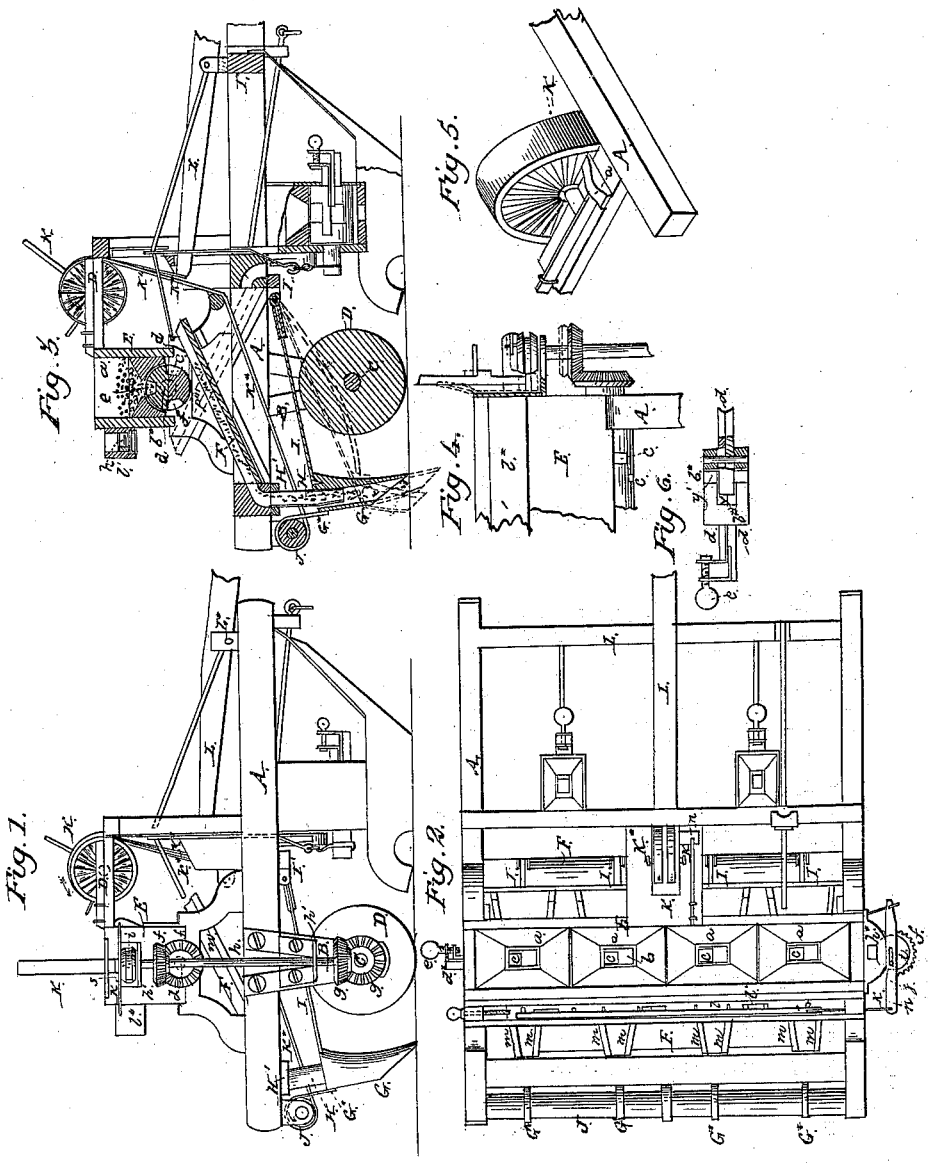

UNITED STATES PATENT OFFICE.

T. S. MILLS, OF IBERIA, OHIO.

IMPROVEMENT IN GRAIN-DRILLS.

Specification forming part of Letters Patent No. 42,390, dated April 19, 1864.

*To all whom it may concern:*

Be it known that I, T. S. MILLS, of Iberia, in the county of Morrow and State of Ohio, have invented a new and Improved Seeding-Machine; and I do hereby declare that the following is a full, clear, and exact description of the same, reference being had to the accompanying drawings, forming a part of this specification, in which—

Figure 1 represents a side elevation of my invention. Fig. 2 is a plan or top view of the same. Fig. 3 is a longitudinal vertical section of the same. Fig. 4 is a detached sectional elevation of the mechanism for throwing in and out of gear the seed-distributing device or devices. Fig. 5 is a detached perspective view of the mechanism for adjusting the depth to which the seed is deposited in the ground. Fig. 6 is a detached sectional elevation of a portion of the seed-distributing roller.

Similar letters of reference in the several views indicate corresponding parts.

This invention relates to certain improvements in that class of seeding-machines which can be used for distributing corn or other seeds in hills or in drills or broadcast, and which roll the seed in the ground.

The nature of my invention and its peculiar advantages will be readily understood from the following description.

A represents a frame, made of wood or any other suitable material, and provided with two brackets, B, one on either side, which form the bearings for the axle C of the roller D. The frame A supports the seed-box E, which is divided into four (more or less) compartments, $a$, and from each of these compartments the seed is discharged by the action of a roller, $b$, each containing three or more adjustable seed-cells, $c$. These rollers are of a peculiar construction, each being made of two parts, $b^\times b'^\times$, (see Fig. 6,) which are provided with cavities 7 7', arranged in such relation toward each other that the cavities of one part are opposite the projections between the cavities of the other part, and that when the two parts are pushed together the cavities of one part are filled out by the projection of the other, and vice versa, and a continuous cylinder is formed. The several rollers, $b$, are all secured to a common shaft, $d$, which extends throughout the entire hopper, and which is split in two halves, $d^\times d'^\times$, which are connected by a screw, $e$, passing through suitable brackets secured to the ends of the two halves of the shaft. The two parts $b^\times b'^\times$ of the rollers $b$ are secured one to the half $d^\times$ and the other to the half $d'^\times$ of the shaft $d$, and by turning the screw $e$ the two halves of said shaft are made to slide one on the other, and the rollers $b^\times b'^\times$ are pushed together or drawn apart. By these means the cavities 7 7', which form the seed-cells, are increased or decreased simultaneously and uniformly in all the rollers throughout the hopper, and they are thereby adjusted to correspond to the quantity and size of seed to be distributed.

The shaft $d$ has its bearings in the ends of the hopper, and a rotary motion is imparted to it by a bevel-gear, $f f'$, above and a similar bevel-gear, $g g'$, below from the axle C of the roller D. The bevel-wheels $f$ and $g$ are firmly secured to the ends of the shafts $d$ and $c$, and the bevel-wheels $f'$ and $g'$ are secured to the vertical arbor $h$, which has its bearings in brackets $h'$, and to which a vertically-sliding motion can be imparted by the spring-lever $h^\times$. By raising the arbor $h$ the wheels $f'$ and $g'$ are thrown out of gear with the wheels $f$ and $g$, and the motion of the roller D is not transmitted to the shaft $d$; but if the arbor $h$ is depressed the wheels $f'$ and $g'$ are thrown in gear with the wheels $f$ and $g$, and the shaft $d$ rotates with the roller D. The upper end of the arbor $h$ carries a roller, $i$, with an eccentric wrist-pin, $j$, which passes through a slot in a lever, $k$, and by its action on said lever a reciprocating motion is imparted to the slide $l$ in the secondary hopper, $l^\times$, which serves to distribute grass or other small seed, and which may also be used for the distribution of a fertilizer simultaneously with the seed distributed from the main hopper E. The seed discharged from the main hopper E drops down upon the inclined scattering-board F, one surface of which is provided with open conductors $m$, to carry the seed to the shoes G, and the other surface of which is smooth for sowing broadcast. Either surface can be turned up, and said board may be inclined toward the rear or toward the front, as may be desired.

H are flexible tubes, which conduct the seed from the board F to the shoes, and these tubes are secured to a board, H', which can be readily detached from the frame A and refastened in case the position of the board F is to be changed.

The shoes G are rigidly attached to the outer ends of spring-bars I, which are hinged to the cross-bar I' in front of the hopper E, and said shoes are suspended from belts G, which are fastened to the rocking roller or shaft J and wind round it once or oftener, as may be desired. The spring-bars I are sufficiently stiff to hold the shoes in the ground; but if one of the shoes meets with an obstruction the bar to which it is attached will give and allow the shoe to pass over said obstruction without disturbing the correct action of the other shoes, as illustrated in blue outlines in Fig. 3.

The shoes G are raised from or lowered to the ground by the action of a serrated lever-disk, K, from which a belt, $K^\times$, extends round the rock-shaft J. By turning said lever-disk in the direction of the arrow marked on it in Figs. 1 and 2 the rock-shaft turns in the direction of the arrows marked on it in the same figures and the shoes are raised from the ground, and by turning the lever-disk in the opposite direction the shoes are lowered. Said disk is held in the desired position by a spring-catch, $a$, catching in its serrated side, and in order to lower the shoes this spring-catch has to be forced back so that its point will clear the teeth in the side of the disk. A belt, $K'^\times$, leads from the disk K to the rear end of the draft-pole L, which is hinged to the front cross-bar, $L^\times$, of the frame A. The front end of the draft-pole being held at a uniform height by the draft-animals, it is obvious that by raising the rear end of the same the front end of the frame A is raised, and vice versa, and consequently by turning disk K in the direction of the arrow marked on it in Figs. 1 and 2 the shoes G and the front end of the frame A are raised simultaneously, and by turning the disk in the opposite direction they are lowered simultaneously, and the depth to which the seed is deposited in the ground can thus be regulated.

The roller D is made in as many sections as there are shoes on the machine, with a washer between the adjoining sections to allow the spring-bars I to fall between them when the shoes are in the ground, as shown in red outlines in Fig. 3.

I am aware that seed-rollers have before been constructed in two parts divided longitudinally in a different manner from mine and adjustable to regulate the size of the seed-pockets.

What I claim as new, and desire to secure by Letters Patent, is—

1. In combination with a seed distributing roller, $b$, composed of two parts, $b^\times\ b'^\times$, each provided with cavities 7 7', the shaft $d$, divided longitudinally in a plane or planes coincident or parallel with its axis into parts of segmental form, one attached to each part of the roller $b$ for moving the same, substantially as herein described.

2. The vertically-adjustable arbor $h$ and bevel-gears $f f', g g'$, in combination with roller D and seed-distributing roller $b$, constructed and operating as and for the purpose set forth.

3. The lever-disk K, with belts $K^\times\ K'^\times$, in combination with the hinged draft-pole L, rocking roller J, belts $G^\times$, and shoes G, all constructed and operating in the manner and for the purpose specified.

4. The combination of the spring-bars I with the vertically-adjustable shoes G and sectional roller D, as and for the purpose described.

T. S. MILLS.

Witnesses:
 THOMAS HINDMAN,
 MARY A. HINDMAN.